United States Patent
Arumugham et al.

(10) Patent No.: US 12,197,298 B1
(45) Date of Patent: Jan. 14, 2025

(54) SYSTEMS AND METHODS FOR DATA MANAGEMENT USING CONTROLLERS

(71) Applicant: NetApp, Inc., San Jose, CA (US)

(72) Inventors: Kalaivani Arumugham, San Jose, CA (US); Parag Sarfare, San Jose, CA (US); Prachi Deskmukh, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/598,913

(22) Filed: Mar. 7, 2024

(51) Int. Cl.
*G06F 11/00* (2006.01)
*G06F 11/14* (2006.01)

(52) U.S. Cl.
CPC ...... *G06F 11/1469* (2013.01); *G06F 11/1446* (2013.01); *G06F 11/1456* (2013.01); *G06F 11/1458* (2013.01); *G06F 2201/84* (2013.01)

(58) Field of Classification Search
CPC ............ G06F 11/1446; G06F 11/1456; G06F 11/1458; G06F 11/1469; G06F 2201/84
See application file for complete search history.

(56) References Cited

U.S. PATENT DOCUMENTS

| | | | | |
|---|---|---|---|---|
| 7,464,236 B2 * | 12/2008 | Sano | | G06F 11/2076 714/6.1 |
| 8,271,438 B2 * | 9/2012 | Takahashi | | G06F 11/2058 707/613 |
| 8,375,004 B2 * | 2/2013 | Kondo | | G06F 11/1456 707/648 |
| 9,081,754 B1 * | 7/2015 | Natanzon | | G06F 11/2058 |
| 2006/0069889 A1 * | 3/2006 | Nagaya | | G06F 11/2071 711/114 |
| 2006/0259722 A1 * | 11/2006 | Watanabe | | G06F 11/1469 711/162 |
| 2007/0067586 A1 * | 3/2007 | Mikami | | G06F 11/1471 711/162 |
| 2011/0251993 A1 * | 10/2011 | Kondo | | G06F 11/2082 707/613 |
| 2016/0342490 A1 * | 11/2016 | Deguchi | | G06F 3/0605 |
| 2017/0277600 A1 * | 9/2017 | Kamimoto | | G06F 11/2094 |
| 2017/0300233 A1 * | 10/2017 | Sato | | G06F 3/065 |
| 2021/0334181 A1 * | 10/2021 | Satoyama | | G06F 16/10 |

* cited by examiner

*Primary Examiner* — Joshua P Lottich
(74) *Attorney, Agent, or Firm* — Finnegan, Henderson Farabow, Garrett & Dunner LLP

(57) ABSTRACT

A data management system can include a set of storage media configured to implement a storage space and a set of controllers. The set of controllers can be configured to write to the storage space and to implement a set of nodes. The set of controllers can include a first controller that implements a first node and includes a first persistent memory, a second controller that implements a second node and includes a second persistent memory and a third controller that implements a third node and includes a third persistent memory. The third node can be configured to write third node journal data to the first persistent memory. The first node can be configured to generate first node journal data based on a first request received from a backend, write the first node journal data to the first persistent memory, and replicate the journal data to the second persistent memory.

22 Claims, 10 Drawing Sheets

SYSTEMS AND METHODS FOR DATA MANAGEMENT USING CONTROLLERS

BACKGROUND

Data management systems can include controllers that communicate with storage devices. The controllers can be configured to service transactions from another system. Such transactions can include create, read, write, and delete requests concerning data stored in the storage devices.

Some data management systems can be configured to use storage space on the controllers to service transactions. For example, a controller can receive a write request, update a log file stored on the controller, and then acknowledge the write request. As an additional example, a controller can receive a read request, potentially generate a response using the log file, and then return the response. The controller can periodically update the data stored on storage space using the log file and then flush the log file. In this manner, the latency associated with writing data to or retrieving data from the storage devices can be reduced.

Data management systems that use log files stored on controllers must account for the possibility of controller failure. When a controller fails, the log file stored on the controller may become inaccessible to other controllers. Furthermore, the failed controller may no longer service transactions.

SUMMARY

Certain embodiments of the present disclosure relate to a system for data management. The system may include a set of storage media configured to implement a storage space and a set of controllers configured to write to the storage space.

The disclosed embodiments include a data management system. The data management system can include a set of storage media configured to implement a storage space; and a set of controllers configured to implement a set of nodes. The set of nodes can be configured to write to the storage space. The set of controllers can include a first controller that implements a first node and includes a first persistent memory, a second controller that implements a second node and includes a second persistent memory, and a third controller that implements a third node and includes a third persistent memory. The third node can be configured to write third node journal data to the first persistent memory. The first node can be configured to generate first node journal data based on a first request received from a backend, write the first node journal data to the first persistent memory, replicate the first node journal data to the second persistent memory, obtain a failure indication for the third node, receive a second request from the backend, and based on the failure indication and the received second request, generate and provide a reply to the backend using the third node journal data.

The disclosed embodiments include a computer-implemented method for data management. The method can be performed by a set of nodes implemented by a set of controllers. The set of controllers can include a first controller that implements a first node and includes a first persistent memory, a second controller that implements a second node and includes a second persistent memory, and a third controller that implements a third node and includes a third persistent memory. The method can include configuring the third node to write third node journal data to the first persistent memory. The method can further include configuring the first node to: generate first node journal data based on a first request received from a backend, write the first node journal data to the first persistent memory; replicate the first node journal data to the second persistent memory; obtain a failure indication for the third node; receive a second request from the backend; and based on the failure indication and the received second request, generate and provide a reply to the backend using the third node journal data.

The disclosed embodiments include a data management system. The system can include a disk unit containing a set of storage media configured to implement a storage space, a first persistent memory, and a second persistent memory. The system can further include a set of controllers configured to write to the storage space and to implement a set of nodes, the set of nodes including a first node and a second node. The first node can be configured to generate first node journal data based on a first request received from a backend and write the first node journal data to the first persistent memory. The second node can be configured to: obtain a failure indication for the first node; receive a second request from the backend; obtain the first node journal data from the second persistent memory; and, based on the failure indication and the received second request, generate and provide a reply to the backend using the first node journal data.

The disclosed embodiments further include computer-implemented methods. The computer-implemented methods can include performing the above operations using the above systems.

The disclosed embodiments further include non-transitory, computer-readable media. The non-transitory, computer-readable media can contain instructions for configuring the above systems to perform the above operations.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Figure 1:
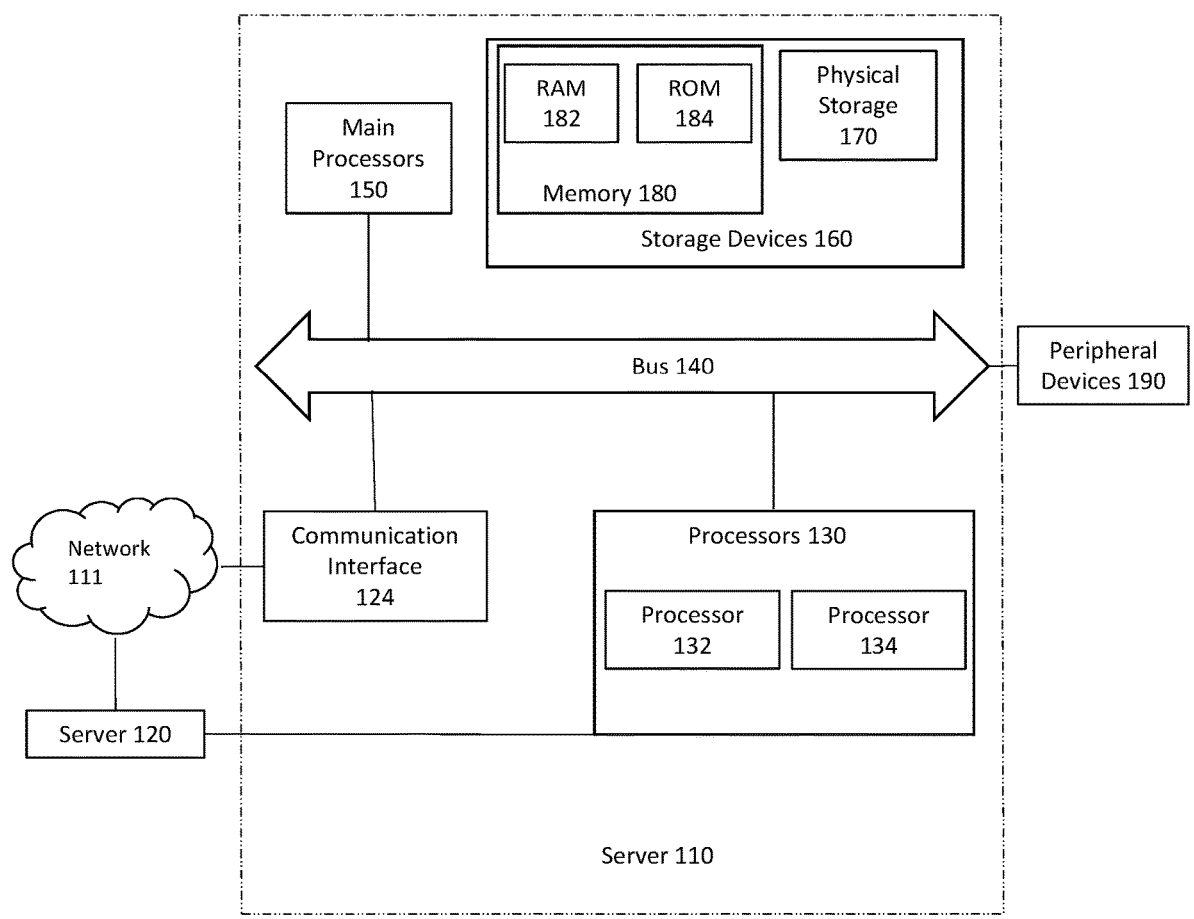
FIG. 1 illustrates a schematic diagram of an exemplary server of a computing system, consistent with disclosed embodiments.

FIG. 1 illustrates a schematic diagram of an exemplary server 110 of computing system 100, according to some embodiments of the present disclosure. According to FIG. 1, server 110 includes a bus 140 or other communication mechanisms for communicating information, one or more processors 130 communicatively coupled with bus 140 for processing information, and one or more main processors 150 communicatively coupled with bus 140 for processing information. Processors 130 can be, for example, one or more microprocessors. In some embodiments, one or more processors 130 includes processor 132 and processor 134, and processor 132 and processor 134 are connected via an inter-chip interconnect of an interconnect topology. In some embodiments, processor 134 can be a dedicated hardware accelerator (such as a neural network processing unit) for processor 132. Main processors 150 can be, for example, central processing units ("CPUs").

Server 110 may transmit data to or communicate with another server 120 through a network 111. Network 111 may be a local network, an internet service provider, Internet, or any combination thereof. Communication interface 124 of server 110 is connected to network 111, which may enable communication with server 120. In addition, server 110 can be coupled via bus 140 to peripheral devices 190. Such peripheral devices 190 can include displays (e.g., cathode ray tube (CRT), liquid crystal display (LCD), touch screen, etc.) and input devices (e.g., keyboard, mouse, soft keypad, etc.).

Server 110 may be implemented using customized hard-wired logic, one or more ASICs or FPGAs, firmware, or program logic that in combination with the server causes server 110 to be a special-purpose machine.

Server 110 further includes storage devices 160, which may include memory 180 and physical storage 170 (e.g., hard drive, solid-state drive, etc.). Memory 180 may include random access memory (RAM) 182, which may also be a dynamic random-access memory (DRAM) and read-only memory (ROM) 184. Storage devices 160 maybe communicatively coupled with processors 130 and main processors 150 via bus 140. Storage devices 160 may include a main memory, which can be used for storing temporary variables or other intermediate information during execution of instructions to be executed by processors 130 and main processors 150. Such instructions, after being stored in non-transitory storage media accessible to processors 130 and main processors 150, render server 110 into a special-purpose machine that is customized to perform operations specified in the instructions.

Various forms of media can be involved in carrying one or more sequences of one or more instructions to processors 130 or main processors 150 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal, and appropriate circuitry can place the data on bus 140. Bus 140 carries the data to the main memory within storage devices 160, from which processors 130 or main processors 150 retrieves and executes the instructions.

Figure 2:
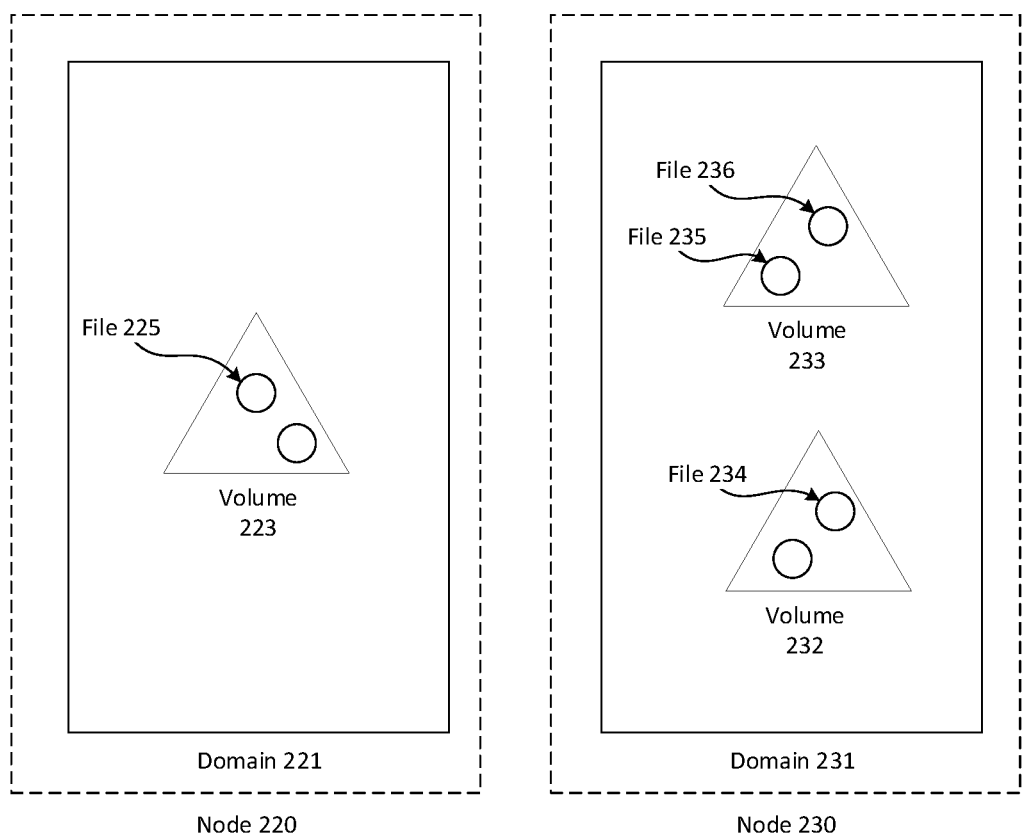
FIG. 2 depicts logical components and relationships of an exemplary data management system, consistent with disclosed embodiments.
Figure 2:
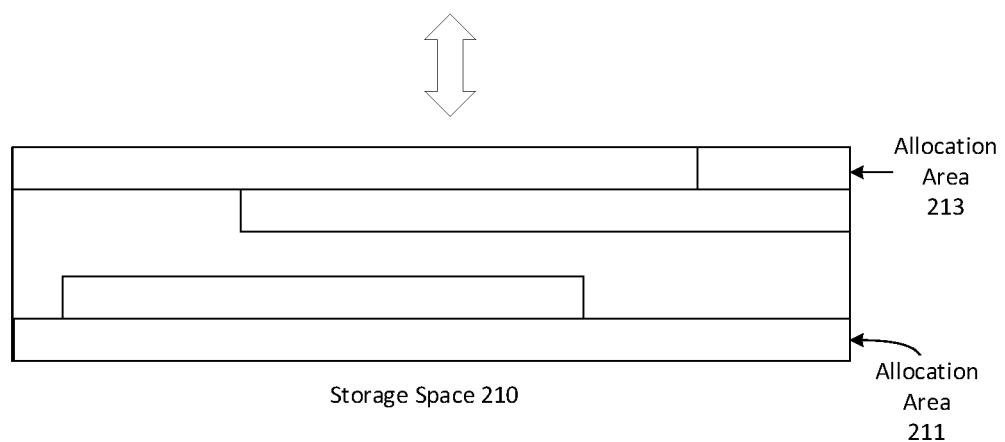

FIG. 2 depicts logical components and relationships of an exemplary data management system, consistent with disclosed embodiments. Logical components of the system can include a storage space 210 and nodes (e.g., node 220 and node 230). In some embodiments, storage space 210 can be divided into allocation areas (e.g., allocation area 211 and allocation area 213). In some embodiments, nodes can be configured to implement domains (e.g., domain 221 and domain 231). In some embodiments, domains can host volumes (e.g., volume 223, volume 232, and volume 233). In some embodiments, volumes can include files (e.g., file 225, file 234, file 235, and file 236). In some embodiments, files can be implemented using blocks stored in allocation areas of storage space 210.

Consistent with disclosed embodiments, storage space 210 can be implemented using storage device(s). Storage space 210 can be a physical volume block number space (PVBN), in which a block number is associated with a physical storage location in a storage device. In some embodiments, a block can map to an amount of physical memory between 1 kB and 40 kB. As described herein, storage space 210 can be divided into allocation areas. In some embodiments, an allocation area can contain blocks that map to an amount of physical memory between 1 GB and 100 GB.

Consistent with disclosed embodiments, a node can be responsible for processing certain transactions received by the data management system (e.g., transactions from certain addresses, devices, entities, or the like; transactions for certain domains, volumes, or the like). In some embodiments, a node can be implemented by a corresponding controller of the data management system. The node can encapsulate the processing, storage, and communication capabilities of the controller. In some embodiments, a node can encapsulate a collection of processing, storage, and communication capabilities provided by a computing cluster or cloud computing platform (e.g., a virtual machine, container, or the like simulating a physical controller). Memory, volatile memory, persistent memory, or the like described as being including or contained in a node can be physically located in (or accessible to) the controller (or computing cluster or cloud computing platform) that implements the node.

Consistent with disclosed embodiments, a node can be configured to implement a domain. In some embodiments, a data management system can support the transfer of domains among nodes. For example, the system can maintain a mapping of domains to nodes. The system can update the mapping to transfer responsibility for a domain from one node to another node (e.g., when a node fails). The disclosed embodiments are not limited to any particular implementation of such a mapping. In some embodiments, each node can maintain such a mapping. Transferring a domain across nodes can then include updating the mappings maintained by the individual nodes.

Consistent with disclosed embodiments, a domain can encapsulate allocation areas and volumes. In some embodiments, a domain can be responsible for maintaining the consistency of the encapsulated volumes and allocation areas. A domain can perform update operations to maintain the consistency of the encapsulated volumes and allocation areas.

Consistent with disclosed embodiments, a domain can control allocation area(s). FIG. 2 depicts, as shaded, allocation areas controlled by domain 221 (e.g., allocation area 211) and, as unshaded, allocation areas controlled by domain 231 (e.g., allocation area 213). For example, domain 221 can read and write to the blocks contained in allocation area 211, while domain 231 can only read from blocks contained in allocation area 211. In some embodiments, all allocation areas within the storage space are controlled by a domain. In some embodiments, some allocation areas may remain uncontrolled.

In some embodiments, a domain can transfer control of allocation areas to another domain. For example, domain 221 can transfer allocation area 211 to domain 231. Such functionality can enable domains to acquire needed space (or release unneeded space), thereby improving the storage efficiency of the system by preventing the fragmentation of unused space across multiple static collections of physical storage devices.

In some embodiments, a domain can allocate or free blocks within an allocation area that it controls. The disclosed embodiments are not limited to a particular method or data structure for allocating and freeing blocks within an allocation area. In some embodiments, a bitmap or similar data structure can track which blocks in the allocation area (or overall storage space) are allocated. The domain can allocate or free a block by writing to the bitmap.

Consistent with disclosed embodiments, a domain can be configured to host volumes. In some embodiments, a volume can be a virtual file system included in a domain. Such an architecture can provide efficiency and administrative benefits. For example, the computational cost of an update operation can be amortized over the traffic associated with the multiple (e.g., tens, hundreds, thousands, or more) volumes in the domain. As an additional example, clients and administrators may interact with volumes using similar operations. For example, duplicating an entire volume (e.g., by an administrator) and duplicating a directory within a volume (e.g., by a client) may involve similar operations. Volumes can be transferred among domains, enabling failure recovery and workload shifting. The ability to transfer volumes can improve the reliability and capacity of the system by supporting recovery from node failures and preventing overloading of individual nodes.

Consistent with disclosed embodiments, a volume can contain files, objects (e.g., S3 objects or the like), or other content. For ease of description, the contents of volumes are described herein with respect to files. Such files can be implemented using blocks stored in allocation areas of storage space 210. In some embodiments, a file included in a volume hosted by a domain can include blocks stored in allocation areas controlled by that domain or other domains. For example, as depicted in FIG. 2, file 225 is included in volume 223, which is hosted by domain 221, and includes blocks in allocation areas controlled by domain 221 (e.g., as indicated with a shaded circle). Similarly, file 234 is included in volume 232, which is hosted by domain 231, and includes blocks in allocation areas controlled by domain 231 (e.g., as indicated with an unshaded circle). However, volume 233 contains files that include blocks stored in allocation areas controlled by domain 221 (e.g., file 235) and by domain 231 (e.g., file 236). As may be appreciated, as part of performing an update operation, domain 231 can determine an updated version of file 235, write the updated version of file 235 to a block in an allocation area controlled by domain 231 (e.g., allocation area 213, or the like), and generate a message instructing domain 221 to free the blocks previously used by file 235.

Consistent with disclosed embodiments, a domain can be configured to perform update operations. Such update operations can update the state of the domain and can be performed repeatedly (e.g., according to a schedule or fixed duration, in response to satisfaction of a condition, or the like). In some embodiments, an update operation can include generating update data using journal data (and optionally data contained in storage space 210). The domain can be configured to write the update data to free blocks in allocation areas of storage space 210 controlled by the domain. In some embodiments, an update operation can include freeing previously used, presently unneeded blocks in storage space 210. A domain can free blocks included in allocation areas it controls, as described herein. In some instances, the domain may attempt to free blocks controlled by other nodes. In such an instance, the domain can provide messages to the domains that control the blocks. The messages can instruct the domains to free the blocks.

In some embodiments, a domain can perform an update operation every 1 to 100 seconds, or another suitable interval. In some embodiments, update operations can be atomic. For example, such an atomic update operation may not affect the functioning of another domain until the update is complete. Accordingly, an atomic update operation performed by a node may appear as a single operation to other nodes. Intermediate stages, states, steps, or processes involved in the performance of the atomic update operation by a first domain may not be visible to other domains.

Consistent with disclosed embodiments, a domain can host a file system. In some embodiments, the file system can be a journaling file system, such as a shadowing journaling file system. As the node implementing the domain services traffic for the domain, transactions (e.g., writes, creates, deletes, or the like) can be accumulated as journal data in a memory (e.g., a non-volatile memory of the controller corresponding to the node that implements the domain) and periodically written to storage (e.g., to a storage device). An update operation can include writing the journal data to the storage. In some embodiments, a domain can be configured to host a write-anywhere-file-layout (e.g., WAFL) system.

As described herein, a WAFL system can include metadata and data. An update operation can include generating a consistency point that includes updated metadata and data. The consistency point can define the state of the WAFL system at a point in time.

Figure 3:
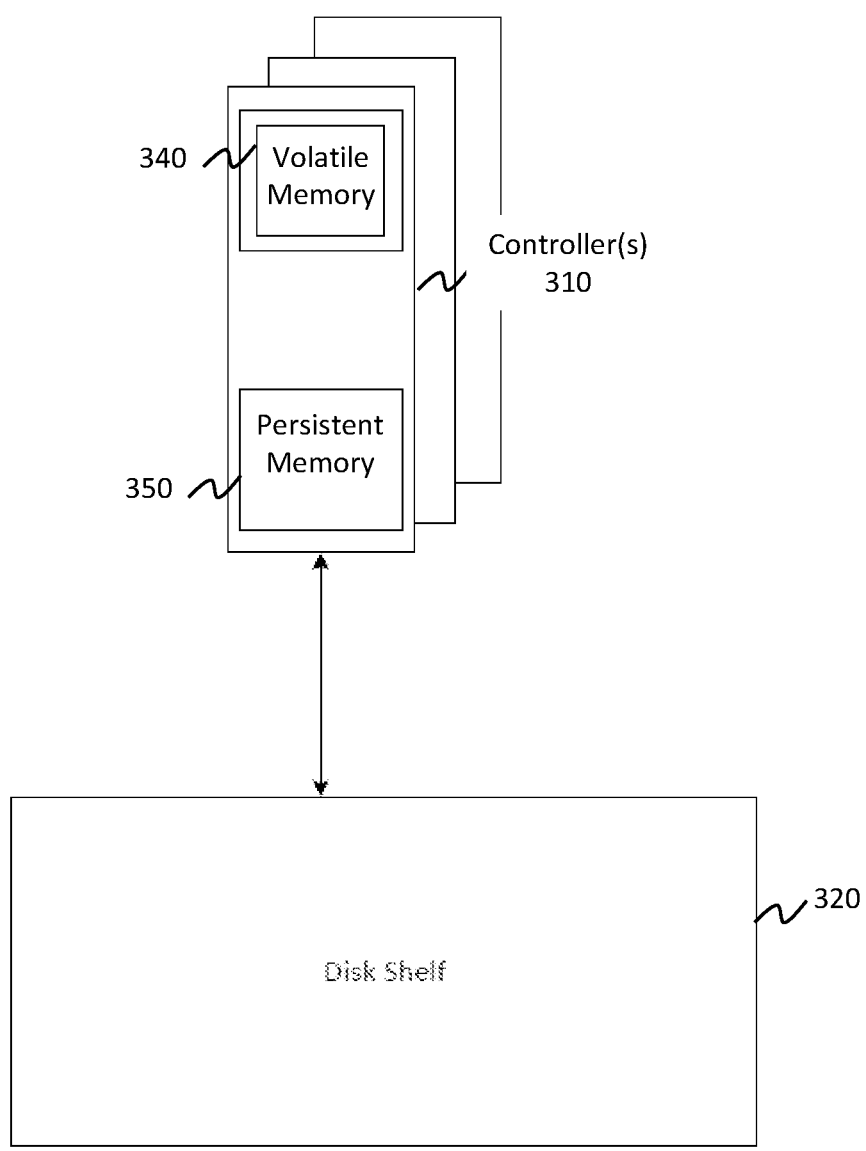
FIG. 3 is a block diagram of a data management system that includes controllers containing persistent memory and a disk shelf, consistent with disclosed embodiments.

FIG. 3 is a block diagram of a data management system 300 that includes controllers (e.g., controller(s) 310) containing persistent memory and a disk shelf 320, consistent with disclosed embodiments. System 300 can be configured to service transaction requests using the controllers and to store log files in the controllers.

Controller(s) 310 can include one or more controllers. Consistent with disclosed embodiments, a controller can include at least one processor and memory. The controller may also contain ports that provide connectivity to clients and disk shelves. The memory can include volatile memory 340, and persistent memory 350. Volatile memory 340 may refer to a data storage device that requires power to maintain the stored information (e.g., SDRAM, or the like). Volatile memory can be configured to retain stored data while powered, but may lose the stored data when unpowered. Persistent memory can be configured to retain stored data when unpowered. In some embodiments, persistent memory can be implemented using non-volatile random-access memory (NVRAM). In some embodiments, NVRAM may be a battery-backed static RAM. In other embodiments, NVRAM may be a flash memory. In other embodiments, NVRAM may be a ferroelectric RAM.

A controller can be configured to service transactions received from a client system to persistent memory 350. In some embodiments, the controller can process the transactions into journaling data, which can be written to a log in persistent memory 350. In some embodiments, the log can be a non-volatile log (NVLOG). In some embodiments, the log can include journaling data that has not been committed to a consistency point. The controller can be configured to replicate the journaling data to other controllers. In some embodiments, the controller can perform such replication synchronously. In some embodiments, as described herein, one controller can receive journaling data from another controller. The receiving controller can write the received journaling data to a persistent memory or a volatile memory. In some instances, the journaling data (or updates based at least in part on the journaling data) can eventually be written to disk shelf 320.

A controller can be configured to perform additional functions relevant to data management system 300, such as determining whether a transaction is authorized, determining whether the controller has permission to complete a write operation to a particular block in a storage space (e.g., whether the block is within an allocation area controlled by the controller), encrypting and decrypting stored data, generating journaling data from transactions, or other suitable operations.

A controller can be configured to assist data management system 300 in recovering from the failure of another controllers. In some embodiments, a controller can be configured to obtain a failure indication from another controller. In some embodiments, when a failure indication occurs, the other controller has crashed or is experiencing connectivity problems. In some embodiments, the failure indication may include a signal from the failed controller. For example, the failed controller (preceding failure, upon failure, or after failure) can provide a panic signal to the controller (or to all controllers in data management system 300). In various embodiments, the failure indication can be provided by a node running on the controller, or other monitoring software or hardware of the controller. In some embodiments, the failure indication may be the absence of a heartbeat or keep alive signal from the other controller.

Disk shelf 320 may include one or more storage devices, consistent with disclosed embodiments. The storage devices can be configured to implement a storage space, such as storage space 210, as described with respect to FIG. 2. In some embodiments, a disk shelf may include a physical enclosure. The one or more storage devices can be installed within the physical enclosure. The physical enclosure can be communicatively connected to controller(s) 310. In some embodiments, controller(s) 310 may communicate with disk shelf 320 regarding data stored on the controller(s). In some embodiments, a storage device on the shelf can be shared across all controllers. For example, all storage devices on the disk shelf can be shared across all controllers. Disk shelf 320 can be configured to store metadata information related to the controllers, such as controller identification, an indication that the storage devices are grouped into a storage group, an indication that the storage devices are associated with a logical cluster including the controllers, or the like.

In some embodiments, system 300 can be configured to implement nodes using controllers 310. A node can encapsulate capabilities of a controller (e.g., compute, storage, and communications capabilities). In some embodiments, system 300 can configure or interact with controller(s) 310 through actions performed on or using such nodes. For example, the servicing of transactions and the performance of additional functions can be implemented through actions performed on or using nodes implemented by controller(s) 310. In some embodiments, a failure indication (e.g., a panic signal or the like) can be received from a node. Such a failure indication can also be received by a node (and processed or responded to by the node). Furthermore, in some instances a node may fail independently of the controller implementing the node (e.g., other nodes implemented by the controller may continue to function).

Figure 4:
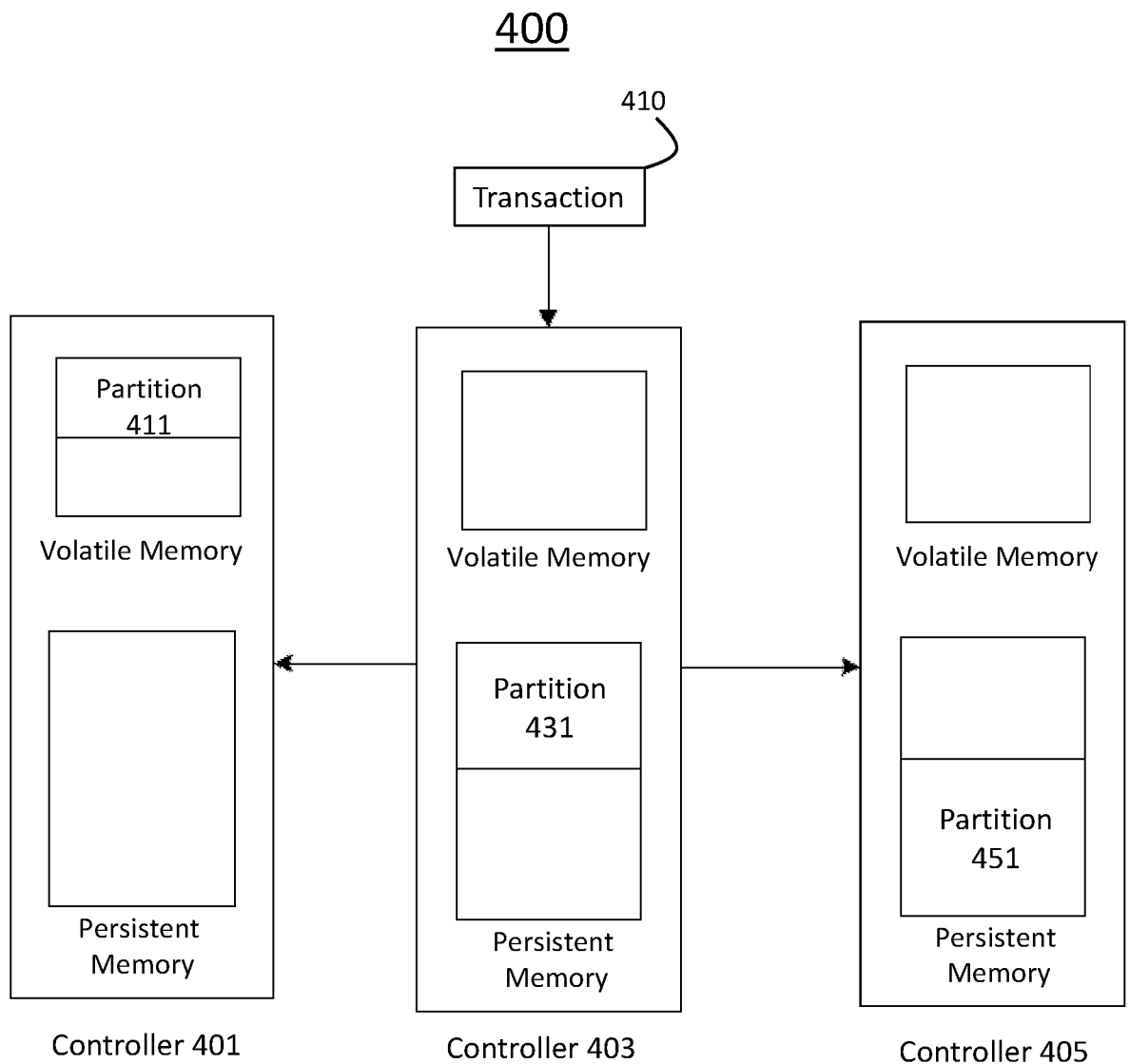
FIG. 4 is a block diagram depicting controllers of a data management system, consistent with disclosed embodiments.

FIG. 4 is a block diagram depicting controllers (e.g., controller 401, 403, and 405) of a data management system 400, consistent with disclosed embodiments. In this example, each of the controllers includes persistent memory (e.g., similar to persistent memory 350) and volatile memory (e.g., similar to volatile memory 340). Controller 403 can receive transaction 410 can generate journal data. Transaction 410 may include one or more create, read, write, or delete requests. Controller 403 can store the journal data in partition 431 of its persistent memory. Controller 403 can also replicate the journal data to the other controllers. For example, controller 405 can be configured to store the journal data in its persistent memory (e.g., in partition 451). As depicted, a controller can use one partition for journal data generated by the controller and another for replicate journal data received from another controller. In some embodiments, the controller that receives the transaction can write, or provide for writing, journal data into the persistent memory of at least one other controller (e.g., controller 403 can write journal data into a partition in the persistent memory of controller 405, the partition configured to store replicated journal data from controller 403). In some embodiments, the controller that receives the transaction can write, or provide for writing, journal data into the volatile memory of at least one other controller (e.g., controller 403 can write journal data into a partition in the volatile memory of controller 401, the partition configured to store replicated journal data from controller 403). In some embodiments, a partition (e.g., partition 411, 431, or 451, or the like) can be a logical division of a memory or storage space that is treated as a separate unit.

In some embodiments, system 400 can be configured to implement nodes using the controllers, similar to system 300. A node can encapsulate capabilities of a controller (e.g., compute, storage, and communications capabilities). In some embodiments, system 400 can configure or interact with controllers through actions performed on or using such nodes, similar to system 300.

Figure 5:
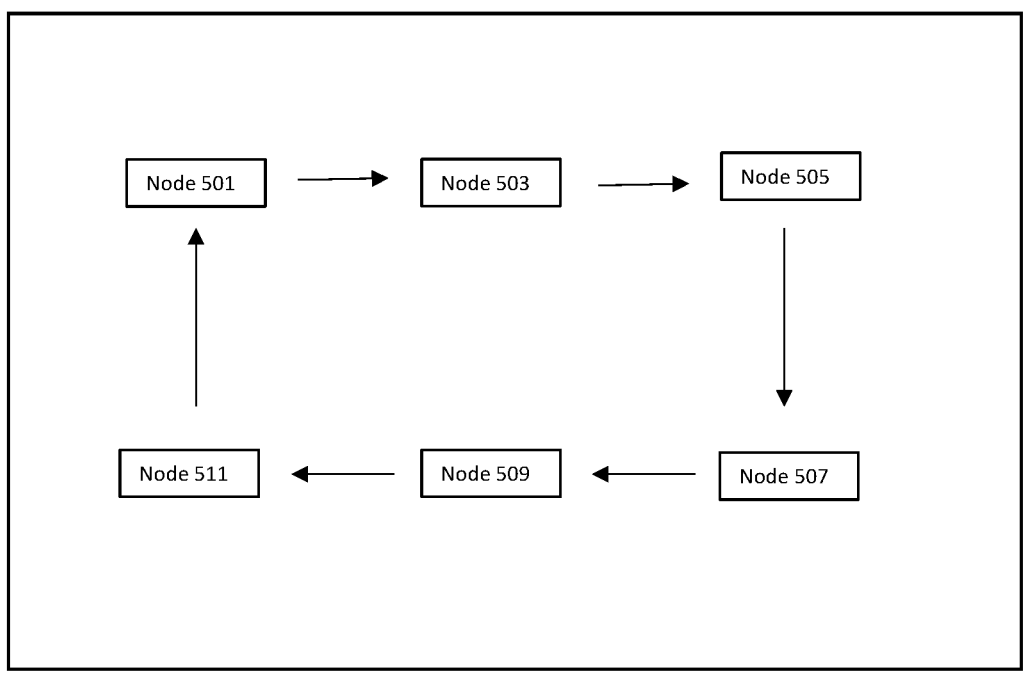
FIG. 5 is a block diagram illustrating an implementation of cyclic node replication for protecting against single node failure, according to some embodiments of the present disclosure.

FIG. 5 is a block diagram illustrating an implementation of cyclic node replication for protecting against single node failure, according to some embodiments of the present disclosure. As may be appreciated, the nodes may be implemented by separate controllers. In some embodiments, multiple nodes may be implemented by a single controller. FIG. 5 shows an exemplary six-node cluster 500. Cluster 500 includes nodes 501, 503, 505, 507, 509 and 511. These nodes are configured to replicate data to protect against a single node failure (or sequential single node failures). As described herein, a node can be configured to store journaling data in a log on the persistent memory of the node. The node can also write (or provide for writing) the journaling data for replication in a log on a persistent (or volatile) memory of another node. For example, node 501 can be configured to generate journaling data from received transaction data and store that journaling data in a log in a persistent memory of node 501. Node 501 can also write that journaling data to a log in a persistent memory of node 503. In addition, node 511 can be configured to generate journaling data from received transaction data and store that journaling data in a log in a persistent memory of node 511. Node 511 can also write that journaling data to a log in a persistent memory of node 501. The arrows depicted in FIG. 5 show the direction in which data is replicated. Node 501 provides replicate journal data to node 503. Node 503 provides replicate journal data to node 505. Node 505 provides replicate journal data to node 507. Node 507 provides replicate journal data to node 509. Node 509 provides replicate journal data to node 511. Node 511 provides replicate journal data to node 501. In some embodiments, there are no changes to the NVRAM size and bandwidth used to manage the cluster (e.g., as compared to an arrangement in which each node mirrors a partner node).

Figure 6:
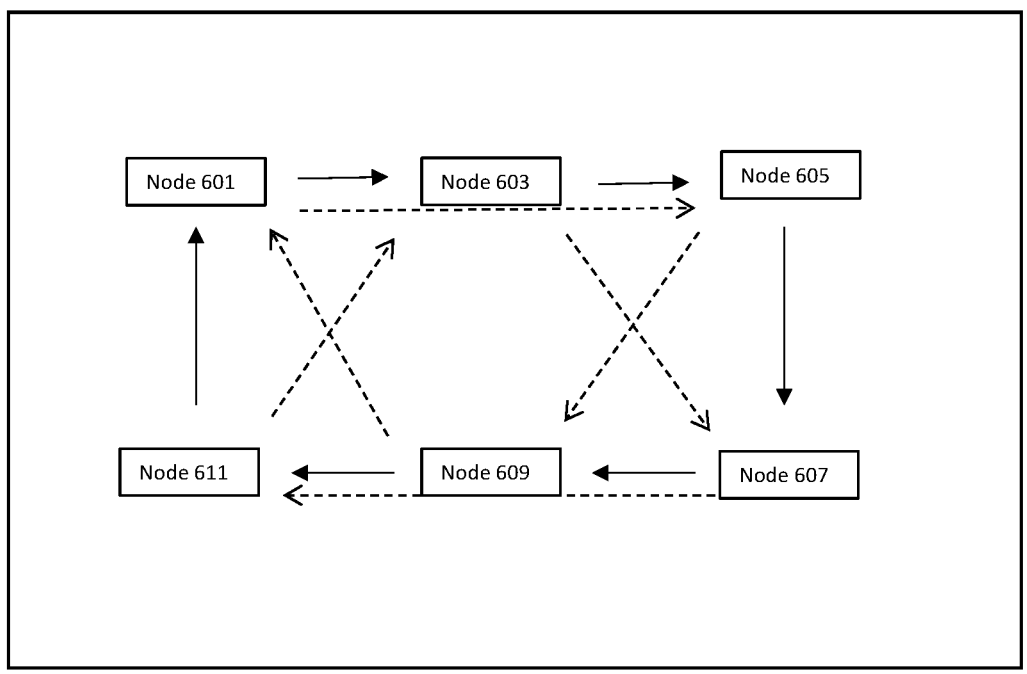
FIG. 6 is a block diagram illustrating an implementation of cyclic node replication for protecting against multi-node failures, according to some embodiments of the present disclosure.

FIG. 6 is a block diagram illustrating an implementation of cyclic node replication for protecting against multi-node failures, according to some embodiments of the present disclosure. As may be appreciated, the nodes may be implemented by separate controllers. In some embodiments, multiple nodes may be implemented by a single controller. FIG. 6 shows an exemplary six-node cluster 600. Cluster 600 includes nodes 601, 603, 605, 607, 609 and 611. These nodes are configured to replicate data to protect against multiple node failures. Each node can be configured to generate journaling data from received transaction data and store that journaling data in a log in both a persistent memory and in memories of multiple other nodes. In the example, depicted in FIG. 6, the memories of the multiple other nodes are volatile memories. For example, in FIG. 6, a solid line arrow from a first node to a second node indicates that the first node has written replicate journal data to a log maintained in the persistent memory of the second node. A broken line arrow from a first node to a second node indicates that the first node has written replicate journal data to a log maintained in the volatile memory of the second node. Node 601 provides replicate journal data to a persistent memory of node 603 and a volatile memory of node 605. Node 603 provides replicate journal data to a persistent memory of node 605 and a volatile memory of node 607. Node 607 provides replicate journal data to a persistent memory of node 607 and a volatile memory of node 609. Node 607 provides replicate journal data to a persistent memory of node 609 and a volatile memory of node 611. Node 609 provides replicate journal data to a persistent memory of node 611 and a volatile memory of node 601. Node 611 provides replicate journal data to a persistent memory of node 601 and a volatile memory of node 603. In some embodiments, there are no changes to the NVRAM size and bandwidth used to manage the cluster (e.g., as compared to an arrangement in which each node mirrors a partner node).

It is to be understood that FIG. 6 is merely exemplary and is not limited to a six-node configuration, nor is it limited to the partnering that is shown using the arrows. For example, each node may be partnered to more than two nodes within a cycle. Variations of the exemplary embodiment are possible.

Figure 7:
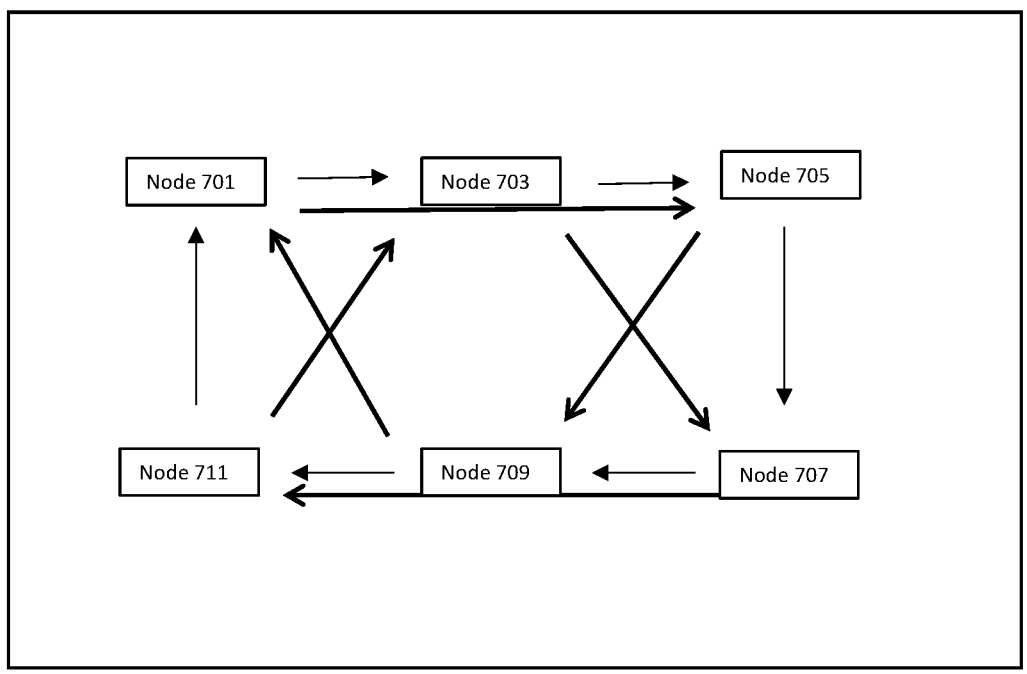
FIG. 7 is a block diagram illustrating another implementation of cyclic node replication for protecting against multi-node failures, according to some embodiments of the present disclosure.

FIG. 7 is a block diagram illustrating another implementation of cyclic node replication for protecting against multi-node failures, according to some embodiments of the present disclosure. As may be appreciated, the nodes may be implemented by separate controllers. In some embodiments, multiple nodes may be implemented by a single controller. FIG. 7 shows an exemplary six-node cluster 700. Cluster 700 includes nodes 701, 703, 705, 707, 709 and 711. These nodes are configured to replicate data to protect against multiple node failures. Each node can be configured to generate journaling data from received transaction data and store that journaling data in a log in both a persistent memory and in memories of multiple other nodes. In the example depicted in FIG. 7, the memories of the multiple other nodes are persistent memories. However, a combination of persistent and volatile memories could also be used, consistent with disclosed embodiments.

It is to be understood that FIG. 7 is merely exemplary and is not limited to a six-node configuration, nor is it limited to the partnering that is shown using the arrows. For example, each node may be partnered to more than two nodes within a cycle. Variations of the exemplary embodiment are possible.

It is to be understood the particular arrangements depicted in FIGS. 5 to 7 are merely exemplary. In some embodiments, a cycle of nodes can include an odd number of nodes. In some embodiments, nodes may be added to a cluster one node at a time, without interfering with the protection against node failure. In some embodiments, a cluster can include more than one cycle of nodes. For example, in a 24-node cluster, there may be four separate cycles of nodes. The cycles may include the same number of nodes (e.g., six each) or differing numbers of nodes (e.g., 2, 4, 8, 10 node cycles, or the like). Such cycles can be formed automatically, semi-automatically, or manually. For example, nodes can be configured into cycles by an administrator of the cluster. As an additional example, the cluster can be configured to automatically form clusters (or recommend clusters for administrator approval). Clusters can be formed based on node (or controller) characteristics, such as controller bandwidth, compute, or storage; or node size (e.g., number or size of domains or volumes hosted by the nodes) or node software characteristics. For example, nodes 501, 503, and 505 can form a cluster when data management software (e.g., ONTAP or the like) running on these nodes is incompatible with data management software running on nodes 507, 509, and 511 (e.g., when version numbers are different, or the like). The cycles may be formed automatically or through the intervention of an administrator of the cluster. The first cycle may be between nodes 501, 503, and 505, while the second cycle may be between nodes 507, 509, and 511. In some instances, when a node is updated from one version of the software to another, the node may leave an old cluster and join a new cluster. For example, when node 507 is updated, it may join the cluster containing nodes 501, 503, and 505. Such flexibility can improve the experience of an administrator tasked with progressively updating an existing cluster to a new software version, or tasked with managing hardware configurations between nodes in a cluster.

Figure 8:
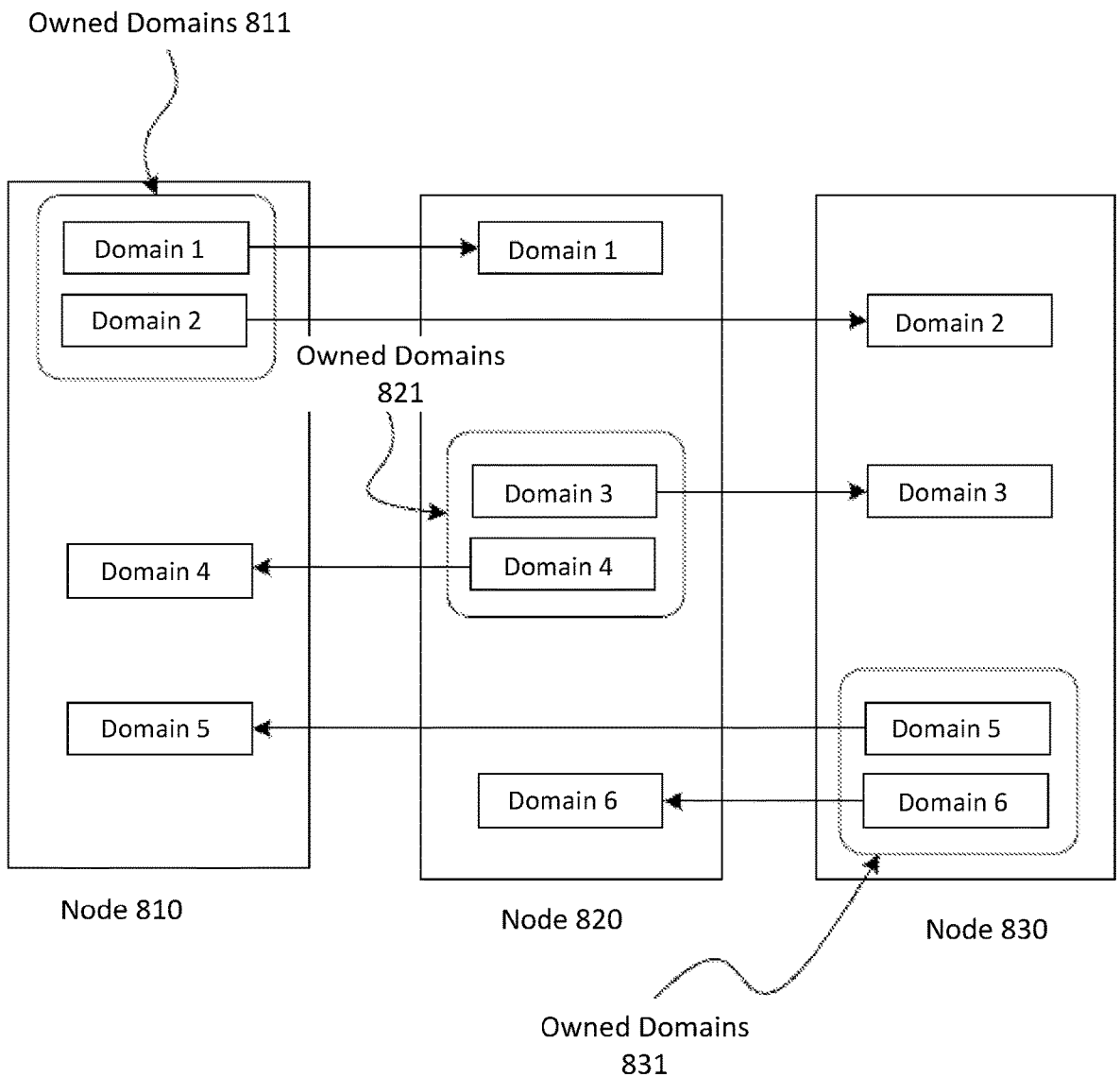
FIG. 8 is a block diagram depicting an exemplary system configured to perform domain-specific disaggregation, consistent with disclosed embodiments.

FIG. 8 is a block diagram depicting an exemplary system 800 configured to perform domain-specific disaggregation, consistent with disclosed embodiments. In this example, system 800 includes node 810, node 820, and node 830. As may be appreciated, nodes 810, 820, and 830 may be implemented by separate controllers. In some embodiments, multiple nodes may be implemented by a single controller. As depicted in FIG. 8, the nodes of system 800 can be configured to store journaling data. Each node can be responsible for multiple domains.

System 800 can be configured to perform load balancing by distributing network traffic across nodes when a node fails, consistent with disclosed embodiments. System 800 can be configured to perform replication at the level of individual domains. Such granular replication can ensure that when a node fails, the entire workload of that failed node is not dumped onto another node (which could lead to a cascading sequence of node failures). Instead, the workload of the failed node is distributed among various nodes within a cluster, thereby improving the resilience of the cluster.

In the example depicted in FIG. 8, each of nodes 810, 820, and 830 owns a set of domains. Node 810 owns domains 1 and 2 (owned domains 811), node 820 owns domains 3 and 4 (owned domains 821), and node 830 owns domains 5 and 6 (owned domains 831). The nodes can be configured to perform domain-level disaggregation by replicating the domains that they own to different other nodes. For example, node 810 can replicate domain 1 to node 810 and domain 2 to node 830. Consistent with disclosed embodiments, such domain-level disaggregation can be combined with the cyclical replication depicted in FIGS. 5 to 7. For example, node 820 could replicate domain 3 to a persistent memory of node 830, and then further replicate domain 3 to the volatile memories (or persistent memories) of other additional nodes (not shown in FIG. 8).

Figure 9:
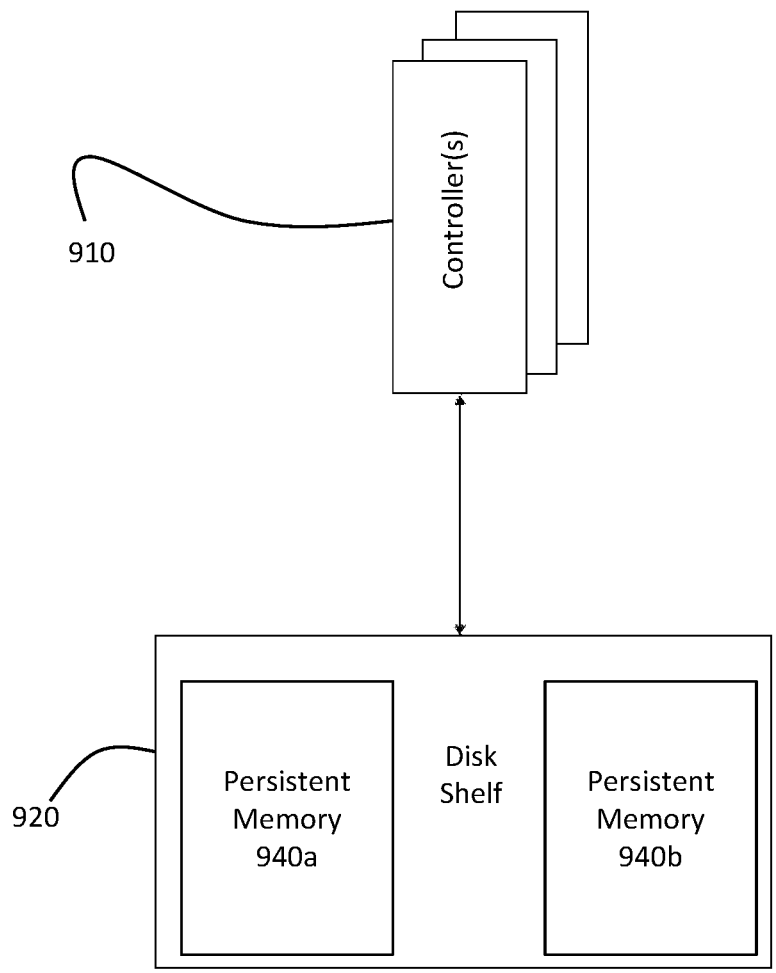
FIG. 9 is a block diagram of a data management system that includes controllers and a disk shelf containing persistent memory, consistent with disclosed embodiments.

FIG. 9 is a block diagram of a data management system 900 that includes controller(s) 910 and a disk shelf 920 containing persistent memory (e.g., persistent memory 940*a* and persistent memory 940*b*), consistent with disclosed embodiments. Disk shelf 920 can be similar to disk shelf 320. However, as shown in FIG. 9, persistent memory 940*a* and persistent memory 940*b* can reside on disk shelf 920. Controller(s) 910 can be similar to controllers 310. However, controllers 910 need not include persistent memory. Instead, such controllers (e.g., nodes implemented by such controllers) can be configured to generate journaling data and then store the journaling data to logs (e.g., an NVLOG) in persistent memory 940*a* and persistent memory 940*b* on disk shelf 920. In this way, any controllers with access to the disk shelf can have access to all logs for all controllers. Such a configuration can help the cluster recover from controller (or node) failures. For example, even when multiple controllers fail, another controller can recover the logs for these failed controllers from persistent memory 940*a* or persistent memory 940*b*. As may be appreciated, persistent memory 940*b* can replicate the logs stored on persistent memory 940*a* (and in some embodiments, additional persistent or volatile memories can provide additional protection).

In some embodiments, a controller can be configured to write journal data to the logs using multiple write operations. In some embodiments, the controller can write the journal data using two write operations. The controller can first write the journal data to a log (e.g., an NVLOG) stored in persistent memory 940*a*. The controller can then write the journal data to a replicant log stored in persistent memory 940*b*. In various embodiments the controller can write the data using remote direct memory access (RDMA), or another suitable technique. In some embodiments, the controller may additionally write the journal data to the disk shelf storage space (or a log contained therein). In some embodiments, the controller may additionally write a consistency point update to the disk shelf storage space using the journal data.

In some embodiments, the controller can write the journal data using a single write operation. The controller can write the journal data to a log stored in persistent memory 940*a*. The controller can also provide instructions for the disk shelf to replicate the journal data into persistent memory 940*b*. In some embodiments, the controller can write the data using RDMA. In some embodiments, the instructions can configure disk shelf 920 to replicate the journal data from persistent memory 940*a* to persistent memory 940*b* using RDMA. For example, the instructions can specify a memory location for writing the journal data to persistent memory 940*b*.

Figure 10:
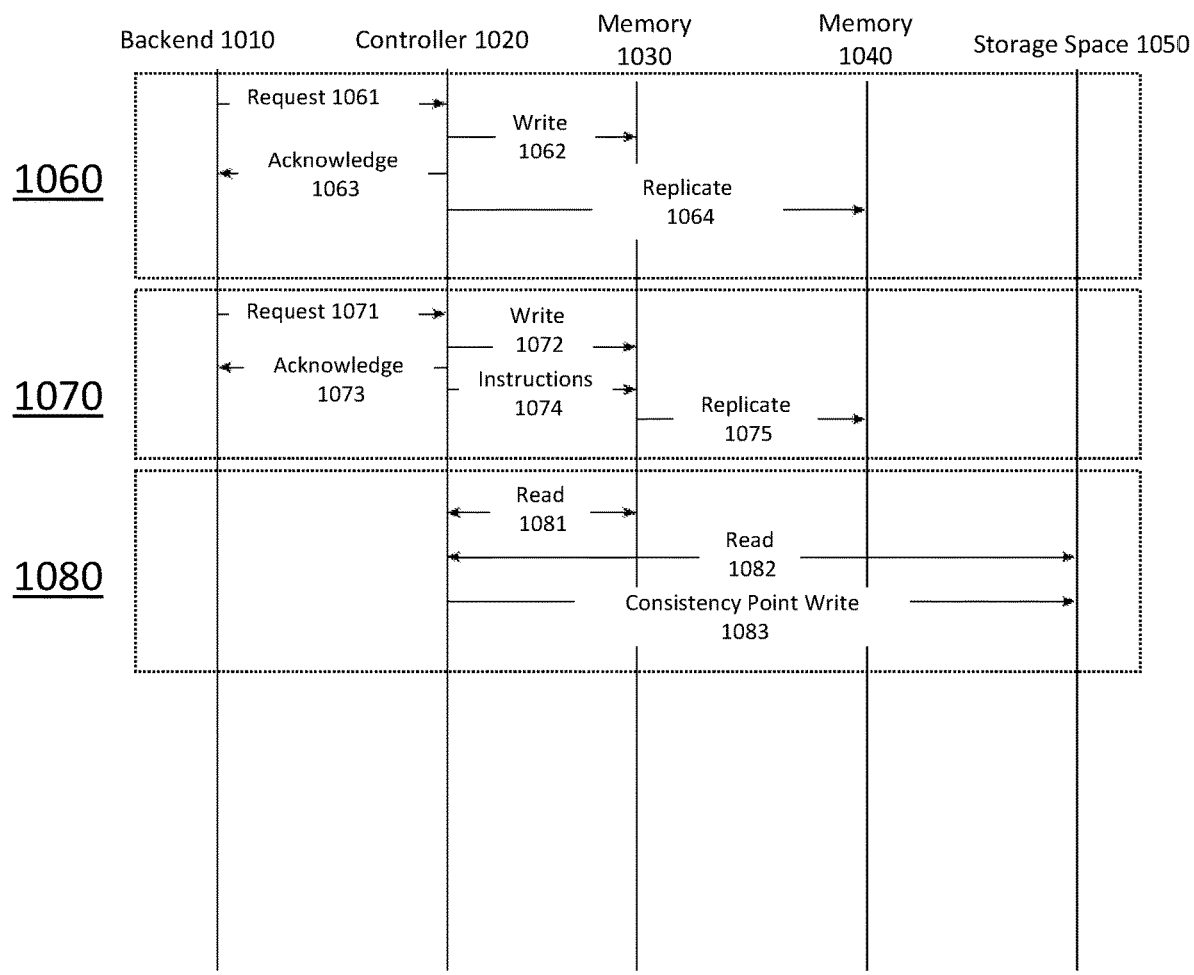
FIG. 10 illustrates exemplary methods for use by a data management system, according to some embodiments of the present disclosure.

FIG. 10 illustrates exemplary methods 1060 to 1080 for use by a data management system, according to some embodiments of the present disclosure. The data management system can be configured as described herein with respect to FIG. 3 or 9. The data management system can implement a storage space, allocation areas, domains, and volumes as described with respect to FIG. 2. The data management system can be in communication with a backend 1010. Backend 1010 can be an endpoint of another system, such as a client-facing application system. The application system can be configured receive client requests through a front end. The application system can generate transactions in response to the client requests and provide the transactions to the data management system through backend 1010. The data management system can provide responses (either data or acknowledgements) to the application system, which can use these responses in replying to the client through the front end. As may be appreciated, this architecture is intended to illustrate the capabilities of the disclosed embodiments and is not intended to be limiting.

The data management system can include a controller 1020. In some embodiments, this controller can include a memory 1030, which can be a persistent memory of controller 1020 (e.g., as discussed with respect to FIG. 3). In some embodiments, memory 1030 can be contained in a disk shelf (e.g., as discussed with respect to FIG. 9). Memory 1030 can then be a persistent memory in the disk shelf.

The data management system can further include a memory 1040. In some embodiments, memory 1040 can be included in another controller of the data management system (e.g., as discussed with respect to FIG. 3). Memory 1040 can be a persistent or volatile memory of the controller. In some embodiments, memory 1040 can be contained in a disk shelf (e.g., as discussed with respect to FIG. 9). Memory 1040 can then be a persistent memory in the disk shelf.

The data management system can further include a storage space 1050. Storage space 1050 can be implemented by storage device(s) contained in the disk shelf, as described herein with respect to FIGS. 2, 3, and 9.

In method 1060, controller 1020 (e.g., a node implemented by controller 1020) can receive a transaction request 1061 from backend 1010, service the transaction request, and then acknowledge the transaction request. Transaction request 1061 can specify creating, reading, writing, or deleting data contained in storage space 1050. Controller 1020 can be configured to generate journal data based on transaction request 1061. Controller 1020 can write the journal data to memory 1030 (e.g., write 1062) and replicate the journal data to memory 1040 (e.g., replicate 1064). Controller 1020 can also acknowledge the request (e.g., acknowledge 1063). In some embodiments, the journal data may include a log (e.g., an NVLOG) or part thereof. As may be appreciated, the contents of acknowledge 1063 can depend on the type of request 1061. For example, when request 1061 is a write request, acknowledge 1063 can indicate that the write has been performed. As an additional example, when request 1061 is a read request, acknowledge 1063 can include the requested data. In some embodiments, controller 1020 may need to read data from storage space 1050 to service such a read request (not shown in FIG. 10).

In method 1070, controller 1020 (e.g., a node implemented by controller 1020) can receive a transaction request 1071 from backend 1010, service the transaction request, and then acknowledge the transaction request. Transaction request 1071 can specify creating, reading, writing, or deleting data contained in storage space 1050. Controller 1020 can be configured to generate journal data based on transaction request 1071. Controller 1020 can also acknowledge the request (e.g., acknowledge 1073). Unlike method 1060, controller 1020 can write the journal data to memory 1030 (e.g., write 1072) and provide instructions (e.g., instruction 1074) to the device containing memory 1040 (e.g., the disk shelf or the like) to replicate the journal data to memory 1040 (e.g., replicate 1075). The content of such instructions can depend on the protocol used to replicate the journal data from memory 1030 to memory 1040. In some embodiments, RDMA can be used to replicate the data from memory 1030 to memory 1040. In such embodiments, the instructions can include the memory address to write the journal data to in memory 1040 (and optionally the size of the journal data).

In method 1080, controller 1020 (e.g., a node implemented by controller 1020) can be configured to perform an atomic update operation of storage space 1050. such an atomic update operation may not affect the functioning of another controller until the update is complete. Accordingly, an atomic update operation performed by a controller may appear as a single operation to other controllers. Intermediate stages, states, steps, or processes involved in the performance of the atomic update operation by a first domain may not be visible to other domains. Controller 1020 can read journal data (read 1081) from memory 1030 and read storage data stored in storage space 1050 (e.g., read 1082). Controller 1020 can generate an update to storage space 1050 based on the journal data and the storage data. For example, a journal file may include an update to part of a stored object. The controller can retrieve the rest of the stored object from storage space 1050. The controller can then generate an updated object using the retrieved object and the update stored in the journal file. The controller can then write the updated object back to storage space 1050 (consistency point write 1083). In some embodiments, the controller can be configured to write updates to unused blocks in the storage space. In this manner, previously written data can still be recovered in case of controller failure using the updated operation. In some embodiments, the data management system can be configured to implement a write-anywhere-file-layout (WAFL) file system and method 1080 can be or include a consistency point update to the WAFL file system. In some embodiments, upon completion of writing the updated data to the storage space, the journal data stored in memory 1030 (and optionally the journal data replicated in memory 1040) may be cleared. Then memory 1030 (and optionally 1040) can be configured to begin accumulating new journal data (e.g., in a new or flushed log).

The disclosed embodiments are not limited to any particular request format. In some embodiments, the request can be formatted according to an NFS3 protocol, or another suitable protocol.

In some embodiments, should controller 1020 fail (e.g., should a node implemented by controller 1020 fail), another controller (e.g., the controller containing memory 1040, or the like) can be configured to respond to requests from backend 1010 using the replicated journal data. In some embodiments, generating and providing a reply to backend 1010 in this manner can ensure that the data management system does not lose data or the ability to respond to requests, should controller 1020 fail.

The disclosed embodiments may further be described using the following clauses:

1. A data management system comprising: a set of storage media configured to implement a storage space; and a set of controllers configured to implement a set of nodes, the set of nodes configured to write to the storage space, the set of controllers including: a first controller that implements a first node and includes a first persistent memory, a second controller that implements a second node and includes a second persistent memory, and a third controller that implements a third node and includes a third persistent memory; and wherein the third node is configured to write third node journal data to the first persistent memory, and the first node is configured to: generate first node journal data based on a first request received from a backend; write the first node journal data to the first persistent memory; replicate the first node journal data to the second persistent memory; obtain a failure indication for the third node; receive a second request from the backend; and based on the failure indication and the received second request, generate and provide a reply to the backend using the third node journal data.

2. The data management system of clause 1, wherein: the set of nodes includes an odd number of nodes.

3. The data management system of at least one of clauses 1 to 2, wherein: the set of nodes further includes additional nodes, each of the additional nodes containing a memory; and the first node is further configured to write the first node journal data to the memories of the additional nodes.

4. The data management system of clause 3, wherein: the memories of the additional nodes are volatile memories.

5. The data management system of clause 3, wherein: the memories of the additional nodes are persistent memories.

6. The data management system of any one of clauses 1 to 5, wherein: the first node controls a first domain and a second domain, the second node is associated with the first domain, and the first node journal data is associated with the first domain; a set of nodes further includes a fourth node associated with the second domain and associated with a fourth memory; and the first node is further configured to: generate additional journal data based on additional requests received from the backend, the additional journal data associated with the second domain; and write the additional journal data to the fourth memory.

7. The data management system of any one of clauses 1 to 6, wherein: the first node is further configured to: generate and write a consistency point update to the storage space using the third node journal data.

8. The data management system of any one of clauses 1 to 7, wherein: the first persistent memory comprises NVRAM.

9. The data management system of any one of clauses 1 to 8, wherein: the first node is configured to write the first node journal data to the second persistent memory using RDMA.

10. The system of any one of clauses 1 to 9, wherein: the set of nodes comprises a set of first nodes forming a first cycle and a set of second nodes forming a second cycle, wherein the first nodes differ from the second nodes by at least one of node or controller characteristics.

11. The system of clause 10, wherein the second nodes differ in at least one software characteristic from the first nodes, and the data management system is configured to: update the at least one software characteristic of one of the second nodes to match the at least one software characteristic of the first nodes; and include the one of the second nodes in the first cycle.

12. The system of any one of clauses 1 to 11, further comprising a disk unit containing persistent memory configured to store and replicate journal data, the set of storage media being contained in the disk unit.

13. A computer-implemented method for data management performed by a set of nodes implemented by a set of controllers, the set of controllers including a first controller that implements a first node and includes a first persistent memory, a second controller that implements a second node and includes a second persistent memory and a third controller that implements a third node and includes a third persistent memory, the method comprising: configuring the third node to write third node journal data to the first persistent memory; and configuring the first node to: generate first node journal data based on a first request received from a backend; write the first node journal data to the first persistent memory; replicate the first node journal data to the second persistent memory; obtain a failure indication for the third node; receive a second request from the backend; and based on the failure indication and the received second request, generate and provide a reply to the backend using the third node journal data.

14. The method of clause 13, wherein: the set of nodes further includes additional nodes, each of the additional nodes containing a persistent memory; and the first node is further configured to write the first node journal data to the persistent memories of the additional nodes.

15. The method of any one of clauses 13 to 14, wherein: the set of nodes further includes additional nodes, each of the additional nodes containing a volatile memory; and the first node is further configured to write the first node journal data to the volatile memories of the additional nodes.

16. The method of any one of clauses 13 to 15, wherein: the first node controls a first domain and a second domain, the second node is associated with the first domain, and the first node journal data is associated with the first domain; a set of nodes further includes a fourth node associated with the second domain and associated with a fourth memory; and the first node is further configured to: generate additional journal data based on additional requests received from the backend, the additional journal data associated with the second domain; and write the additional journal data to the fourth memory.

17. The method of any one of clauses 13 to 16, wherein: the first node is further configured to: generate and write a consistency point update to the storage space using the third node journal data.

18. A data management system comprising: a disk unit containing, at least in part: a set of storage media configured to implement a storage space; a first persistent memory; and a second persistent memory; and a set of controllers configured to write to the storage space and to implement a set of nodes, the set of nodes including a first node and a second node; wherein the first node is configured to generate first node journal data based on a first request received from a backend and write the first node journal data to the first persistent memory; and wherein the second node is configured to: obtain a failure indication for the first node; receive a second request from the backend; obtain the first node journal data from the first or second persistent memory; and based on the failure indication and the received second request, generate and provide a reply to the backend using the first node journal data.

19. The data management system of clause 18, wherein: the first node is further configured to write the first node journal data to the second persistent memory.

20. The data management system of clause 18, wherein: the first node is further configured to provide instructions to the disk unit to write the first node journal data from the first persistent memory to the second persistent memory.

21. The data management system of clause 20, wherein: the first node journal data is written to the second persistent memory using RDMA.

22. The data management system of any one of clauses 18 to 21, wherein: the first persistent memory comprises NVRAM.

23. The data management system of any one of clauses 18 to 22, wherein: the second node is further configured to: obtain the first node journal data from the first or second persistent memory; and generate and write a consistency point update to the storage space using the first node journal data.

24. The data management system of any one of clauses 18 to 23, wherein: the failure indication comprises a panic signal or an absence of a heartbeat or keep alive signal.

25. The data management system of any one of clauses 18 to 24, wherein each controller in the sets of controllers contains, at least in part, persistent memory configured to store and replicate journal data.

26. At least one non-transitory, computer-readable medium containing instructions for configuring a system to perform the operations of any one of clauses 1 to 12 or 18 to 24.

27. A computer-implemented method including the performance of the operation(s) of any one of clauses 1 to 12 or 18 to 24 using the system recited therein.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium can be any tangible medium that can contain or store a program for use by or in connection with an instruction execution system, apparatus, or device. The computer readable medium may be a non-transitory computer-readable medium that stores, or is configured to store, data or instructions that cause a system to operate in a specific fashion. Such non-transitory media can include non-volatile media or volatile media. Media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Program code embodied on a computer readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A data management system comprising:
   a set of storage media configured to implement a storage space; and
   a set of controllers configured to implement a set of nodes, the set of nodes configured to write to the storage space, the set of controllers including:
   a first controller that implements a first node and includes a first persistent memory,
   a second controller that implements a second node and includes a second persistent memory, and
   a third controller that implements a third node and includes a third persistent memory; and wherein the third node is configured to write third node journal data to the first persistent memory, and the first node is configured to:
generate first node journal data based on a first request received from a backend;
write the first node journal data to the first persistent memory;
replicate the first node journal data to the second persistent memory;
obtain a failure indication for the third node;
receive a second request from the backend; and
based on the failure indication and the received second request, generate and provide a reply to the backend using the third node journal data.

2. The data management system of claim 1, wherein:
the set of nodes includes an odd number of nodes.

3. The data management system of claim 1, wherein:
the set of nodes further includes additional nodes, each of the additional nodes containing a memory; and
the first node is further configured to write the first node journal data to the memories of the additional nodes.

4. The data management system of claim 3, wherein:
the memories of the additional nodes are volatile memories.

5. The data management system of claim 3, wherein:
the memories of the additional nodes are persistent memories.

6. The data management system of claim 1, wherein:
the first node controls a first domain and a second domain, the second node is associated with the first domain, and the first node journal data is associated with the first domain;
the set of nodes further includes a fourth node associated with the second domain and associated with a fourth memory; and
the first node is further configured to:
generate additional journal data based on additional requests received from the backend, the additional journal data associated with the second domain; and
write the additional journal data to the fourth memory.

7. The data management system of claim 1, wherein:
the first node is further configured to:
generate and write a consistency point update to the storage space using the third node journal data.

8. The data management system of claim 1, wherein:
the first persistent memory comprises NVRAM.

9. The data management system of claim 1, wherein:
the first node is configured to replicate the first node journal data to the second persistent memory using RDMA.

10. The data management system of claim 1, wherein:
the set of nodes comprises a set of first nodes forming a first cycle and a set of second nodes forming a second cycle, wherein the first nodes differ from the second nodes by at least one of node or controller characteristics.

11. The data management system of claim 10, wherein the second nodes differ in at least one software characteristic from the first nodes, and the data management system is configured to:
update the at least one software characteristic of one of the second nodes to match the at least one software characteristic of the first nodes; and
include the one of the second nodes in the first cycle.

12. The data management system of claim 10, further comprising a disk unit containing persistent memory configured to store and replicate journal data, the set of storage media being contained in the disk unit.

13. A computer-implemented method for data management performed by a set of nodes implemented by a set of controllers, the set of controllers including a first controller that implements a first node and includes a first persistent memory, a second controller that implements a second node and includes a second persistent memory and a third controller that implements a third node and includes a third persistent memory, the method comprising:
configuring the third node to write third node journal data to the first persistent memory; and
configuring the first node to:
generate first node journal data based on a first request received from a backend;
write the first node journal data to the first persistent memory;
replicate the first node journal data to the second persistent memory;
obtain a failure indication for the third node;
receive a second request from the backend; and
based on the failure indication and the received second request, generate and provide a reply to the backend using the third node journal data.

14. The method of claim 13, wherein:
the set of nodes further includes additional nodes, each of the additional nodes containing a persistent memory; and
the first node is further configured to write the first node journal data to the persistent memories of the additional nodes.

15. The method of claim 13, wherein:
the set of nodes further includes additional nodes, each of the additional nodes containing a volatile memory; and
the first node is further configured to write the first node journal data to the volatile memories of the additional nodes.

16. The method of claim 13, wherein:
the first node controls a first domain and a second domain, the second node is associated with the first domain, and the first node journal data is associated with the first domain;
the set of nodes further includes a fourth node associated with the second domain and associated with a fourth memory; and
the first node is further configured to:
generate additional journal data based on additional requests received from the backend, the additional journal data associated with the second domain; and
write the additional journal data to the fourth memory.

17. The method of claim 13, wherein:
the first node is further configured to:
generate and write a consistency point update to a storage space using the third node journal data.

18. A non-transitory, computer-readable medium containing instructions that, when executed by a system including a set of nodes implemented by a set of controllers, the set of controllers including a first controller that implements a first node and includes a first persistent memory, a second controller that implements a second node and includes a second persistent memory and a third controller that implements a third node and includes a third persistent memory, causes the system to perform data management operations comprising:
configuring the third node to write third node journal data to the first persistent memory; and
configuring the first node to:

generate first node journal data based on a first request received from a backend;
write the first node journal data to the first persistent memory;
replicate the first node journal data to the second persistent memory;
obtain a failure indication for the third node;
receive a second request from the backend; and
based on the failure indication and the received second request, generate and provide a reply to the backend using the third node journal data.

19. The non-transitory, computer-readable medium of claim 18, wherein:
the set of nodes further includes additional nodes, each of the additional nodes containing a persistent memory; and
the first node is further configured to write the first node journal data to the persistent memories of the additional nodes.

20. The non-transitory, computer-readable medium of claim 18, wherein:
the set of nodes further includes additional nodes, each of the additional nodes containing a volatile memory; and
the first node is further configured to write the first node journal data to the volatile memories of the additional nodes.

21. The non-transitory, computer-readable medium of claim 18, wherein:
the first node controls a first domain and a second domain, the second node is associated with the first domain, and the first node journal data is associated with the first domain;
the set of nodes further includes a fourth node associated with the second domain and associated with a fourth memory; and
the first node is further configured to:
generate additional journal data based on additional requests received from the backend, the additional journal data associated with the second domain; and
write the additional journal data to the fourth memory.

22. The non-transitory, computer-readable medium of claim 18, wherein:
the first node is further configured to:
generate and write a consistency point update to a storage space using the third node journal data.

* * * * *